US009550856B2

(12) United States Patent
Cookson et al.

(10) Patent No.: US 9,550,856 B2
(45) Date of Patent: Jan. 24, 2017

(54) PHOSPHOROUS BASED POLYADDITION / POLYURETHANE-UREA POLYOLS

(71) Applicant: Dow Global Technologies LLC, Midland, MI (US)

(72) Inventors: Paul Cookson, Schindellegi (CH); Daniel Hoehener, Horgen (CH); Francois M. Casati, Pfaeffikon (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/368,329

(22) PCT Filed: Dec. 17, 2012

(86) PCT No.: PCT/US2012/070139
§ 371 (c)(1),
(2) Date: Jun. 24, 2014

(87) PCT Pub. No.: WO2013/101524
PCT Pub. Date: Jul. 4, 2013

(65) Prior Publication Data
US 2014/0329925 A1 Nov. 6, 2014

Related U.S. Application Data

(60) Provisional application No. 61/580,432, filed on Dec. 27, 2011.

(51) Int. Cl.
| C08G 18/40 | (2006.01) |
| C08G 18/50 | (2006.01) |
| C08G 18/66 | (2006.01) |
| H05B 37/00 | (2006.01) |
| C08G 18/48 | (2006.01) |
| C08G 18/76 | (2006.01) |
| C08G 18/20 | (2006.01) |
| C08G 18/28 | (2006.01) |
| C08G 101/00 | (2006.01) |

(52) U.S. Cl.
CPC ....... *C08G 18/6688* (2013.01); *C08G 18/2063* (2013.01); *C08G 18/2865* (2013.01); *C08G 18/409* (2013.01); *C08G 18/4841* (2013.01); *C08G 18/5075* (2013.01); *C08G 18/7621* (2013.01); *H05B 37/00* (2013.01); C08G 2101/005 (2013.01); C08G 2101/0083 (2013.01)

(58) Field of Classification Search
CPC ............ C08G 18/0857; C08G 18/0876; C08G 18/388; C08G 18/49; C08G 18/3878–18/3891
See application file for complete search history.

(56) References Cited

U.S. PATENT DOCUMENTS

| 3,321,555 | A | * | 5/1967 | Lutz ........................ C07F 9/09 252/609 |
| 3,445,405 | A | | 5/1969 | Vogt |
| 4,343,914 | A | | 8/1982 | Lee |
| 4,374,209 | A | | 2/1983 | Rowlands et al. |
| 6,391,161 | B1 | | 5/2002 | Danielmeier et al. |
| 6,734,217 | B1 | * | 5/2004 | Herrmann ............ C08G 18/409 521/137 |
| 2009/0136440 | A1 | | 5/2009 | Maas et al. |
| 2010/0056659 | A1 | | 3/2010 | Rosthauser et al. |
| 2010/0160468 | A1 | * | 6/2010 | Stowell ................ C07F 9/4006 521/108 |
| 2010/0239815 | A1 | | 9/2010 | Senkfor et al. |
| 2011/0257287 | A1 | | 10/2011 | Stowell et al. |

FOREIGN PATENT DOCUMENTS

| KR | 2015080095 A1 | * | 7/2015 | |
| WO | 9202567 A1 | | 2/1992 | |
| WO | WO 9202567 A1 | * | 2/1992 | ......... C08G 18/0857 |
| WO | 2010023155 A2 | | 3/2010 | |
| WO | 2012126179 A1 | | 9/2012 | |

OTHER PUBLICATIONS

Machine Translation of KR2015080095A. Jul. 9, 2015.*
Search Report and Written Opinion for PCT/US2012/070139, Mail date Mar. 19, 2013, 10 pages.
International Preliminary Report on Patentability for PCT/US2012/070139, Date of Issuance Jul. 1, 2014, 6 pages.

* cited by examiner

*Primary Examiner* — Robert C Boyle
*Assistant Examiner* — Stephen Rieth

(57) ABSTRACT

Embodiments of the invention include a polymer polyol dispersions. The polymer dispersions include a reaction product of a reaction system, where the reaction system includes: at least one polyol, at least one phosphorus based flame retardant having at least one active hydrogen attached to a nitrogen or oxygen atom, at least one of a co-reactant having an equivalent weight of up to 400 and at least one active hydrogen attached to a nitrogen or oxygen atom, at least one catalyst, and at least one polyisocyanate.

11 Claims, No Drawings

PHOSPHOROUS BASED POLYADDITION / POLYURETHANE-UREA POLYOLS

FIELD OF THE INVENTION

Embodiments of the invention relate to polyols, more specifically to polymer polyols.

BACKGROUND OF THE INVENTION

Polyurethane foams are produced by the reaction of polyisocyanates and polyols in the presence of a blowing agent. In order to improve load-bearing and other foam properties, so-called polymer polyol products have been developed. A common type of polymer polyol is a dispersion of vinyl polymer particles in a polyol. Examples of vinyl polymer particle polyols include so-called "SAN" polyols, which are dispersions of styrene-acrylonitrile. Other common types of polymer polyols are so-called "PHD" polyols (dispersions of polyurea particles) and so-called "PIPA" (polyisocyanate polyaddition) polyols (dispersions of polyurethane and/or polyurethane-urea particles). PIPA and PHD particles may be produced by introducing the appropriate co-reactant or co-reactants into a polyol or polyol blend and reacting the co-reactant(s) with a polyisocyanate in order to polymerize the co-reactant(s). However, there is a desire to increase flame retardant properties in polyurethane foams.

Therefore, there is a need for polymer polyols which enhance flame retardant properties in polyurethane foams.

SUMMARY OF THE INVENTION

Embodiments of the present invention provide for a polymer polyol dispersion which includes PIPA and/or PHD particles which have been formed in situ in the polyol blend in the presence at least one phosphorus based flame retardant.

An embodiment of the invention includes a method of producing a polymer polyol dispersion. The method includes providing at least one reaction system, where the reaction system includes: at least one polyol, at least one phosphorus based flame retardant having at least one active hydrogen attached to a nitrogen or oxygen atom, at least one of a co-reactant having an equivalent weight of up to 400 and at least one active hydrogen attached to a nitrogen or oxygen atom, at least one catalyst, and at least one polyisocyanate.

An embodiment of the invention includes a polymer polyol dispersion. The polymer dispersion includes a reaction product of a reaction system, where the reaction system includes: at least one polyol, at least one phosphorus based flame retardant having at least one active hydrogen attached to a nitrogen or oxygen atom, at least one of a co-reactant having an equivalent weight of up to 400 and at least one active hydrogen attached to a nitrogen or oxygen atom, at least one catalyst, and at least one polyisocyanate.

DESCRIPTION OF EMBODIMENTS OF THE INVENTION

Embodiments of the present invention provide for a polymer polyol dispersion which includes PIPA and/or PHD particles which have been formed in situ in the polyol blend in the presence at least one phosphorus based flame retardant. The polymer polyol dispersion may be a reaction product of a reaction system which includes (a) at least one polyol, (b) at least one phosphorus based flame retardant having at least one active hydrogen attached to a nitrogen or oxygen atom, (c) at least one of a co-reactant having an equivalent weight of up to 400 and at least one active hydrogen attached to a nitrogen or oxygen atom, (d) at least one catalyst, and (e) at least one polyisocyanate.

The least one polyol (a) may include any kind of polyol that is known in the art and include those described herein and any other commercially available polyol. Mixtures of one or more polyols may also be used to produce the polymer polyols according to embodiments of the present invention.

Representative polyols include polyether polyols, polyester polyols, polyhydroxy-terminated acetal resins, hydroxyl-terminated amines. Alternative polyols that may be used include polyalkylene carbonate-based polyols and polyphosphate-based polyols. Preferred are polyols prepared by adding an alkylene oxide, such as ethylene oxide, propylene oxide, butylene oxide or a combination thereof, to an initiator having from 2 to 8, preferably 2 to 6 active hydrogen atoms. Catalysis for this polymerization can be either anionic or cationic, with catalysts such as KOH, CsOH, boron trifluoride, or a double metal cyanide complex (DMC) catalyst such as zinc hexacyanocobaltate or quaternary phosphazenium compound.

Examples of suitable initiator molecules are water, organic dicarboxylic acids, such as succinic acid, adipic acid, phthalic acid and terephthalic acid; and polyhydric, in particular dihydric to octohydric alcohols or dialkylene glycols.

Exemplary polyol initiators include, for example, ethanediol, 1,2- and 1,3-propanediol, diethylene glycol, dipropylene glycol, 1,4-butanediol, 1,6-hexanediol, glycerol, pentaerythritol, sorbitol, sucrose, neopentylglycol; 1,2-propylene glycol; trimethylolpropane glycerol; 1,6-hexanediol; 2,5-hexanediol; 1,4-butanediol; 1,4-cyclohexane diol; ethylene glycol; diethylene glycol; triethylene glycol; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; castor oil; epoxidized seed oil; other modified seed oils containing reactive hydrogens; 1,2,6-hexanetriol; and combination thereof.

The polyols may for example be poly(propylene oxide) homopolymers, random copolymers of propylene oxide and ethylene oxide in which the poly(ethylene oxide) content is, for example, from about 1 to about 30% by weight, ethylene oxide-capped poly(propylene oxide) polymers and ethylene oxide-capped random copolymers of propylene oxide and ethylene oxide. For slabstock foam applications, such polyethers preferably contain 2-5, especially 2-4, and preferably from 2-3, mainly secondary hydroxyl groups per molecule and have an equivalent weight per hydroxyl group of from about 400 to about 3000, especially from about 800 to about 1750. For high resiliency slabstock and molded foam applications, such polyethers preferably contain 2-6, especially 2-4, mainly primary hydroxyl groups per molecule and have an equivalent weight per hydroxyl group of from about 1000 to about 3000, especially from about 1200 to about 2000. When blends of polyols are used, the nominal average functionality (number of hydroxyl groups per molecule) will be preferably in the ranges specified above. For viscoelastic foams shorter chain polyols with hydroxyl numbers above 150 are also used. For the production of semi-rigid foams, it is preferred to use a trifunctional polyol with a hydroxyl number of 30 to 80. Embodiments may encompass amine initiated polyols which are initiated with an alkyl amine as given by the formula below or containing an alkyl amine as part of the polyol chain.

where n and p are independently integers from 2 to 6, A at each occurrence is independently oxygen or hydrogen, m is equal to 1 when A is oxygen and is 2 when A is nitrogen.

The polyether polyols may contain low terminal unsaturation (for example, less that 0.02 meq/g or less than 0.01 meq/g), such as those made using so-called double metal cyanide (DMC) catalysts or may have an unsaturation higher than 0.02 meq/g, provided it is below 0.1 meq/g. Polyester polyols typically contain about 2 hydroxyl groups per molecule and have an equivalent weight per hydroxyl group of about 400-1500.

In certain embodiments, the least one polyol (a) is seeded with a small amount of suspended particles having a maximum particle diameter of less than 5 µm to help with the formation of additional particles through the reaction between the co-reactant and the polyisocyanate. The particles may be either isocyanate non-reactive (such as polyethylene, polypropylene, PVC, vinyl polymer particles and inorganic minerals such as functional silanes, fumed silica, calcium carbonate, titanium dioxide, aluminium trihydrate or barium sulfate) or isocyanate reactive particles (such as PIPA or PHD). The polyol blend may include between about 0.02 weight % and about 5 weight % of the seed particles based on the total weight of polyol blend. All individual values and subranges between about 0.02 and about 5.0% are included herein and disclosed herein; for example, the solid content may be from a lower limit of 0.02, 0.05, 0.1, 0.15, 0.2, 0.25, 0.3, 0.35, 0.4, 0.45, 0.5, 0.6, 0.67, 0.7, 0.75, 0.8, 0.85, 0.9, 1, 1.5, 2, 2.5, 3, or 4 to an upper limit of 0.25, 0.3, 0.35, 0.4, 0.45, 0.5, 0.6, 0.67, 0.7, 0.75, 0.8, 0.85, 0.9, 0.95, 1.5, 2, 2.5, 3, 4, or 5% of the weight of the polyol blend.

The at least one phosphorus based flame retardant (b) may have at least one active hydrogen attached to a nitrogen or oxygen atom. The at least one phosphorus based flame retardant (b) are added to the reaction system, in a concentration of between about 0.5 wt. % and about 15 wt. % of the reaction system, such as between about 1 wt. % and about 5 wt. %. All individual values and subranges between 0.5 and 15 wt % are included herein and disclosed herein; for example, the concentration may be from a lower limit of 0.5, 0.7, 1.0, 1.2, 1.5, 2, 2.5, 3.0, 3.5, 4.0, 4.5, 5, 6, 7, 8, 9, 10, or 12, wt % to an upper limit of 2, 2.5, 3.0, 3.5, 4.0, 4.5, 5, 6, 7, 8, 9, 10, 12, or 15 wt %.

In certain embodiments the at least one phosphorus based flame retardant (b) includes the reaction product of a reaction mixture that includes at least one polyol and at least one phosphorus containing compound having the general formula (1), (2) or combination thereof:

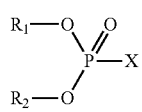

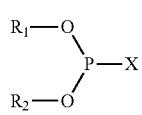

wherein X is a leaving group, $R_1$ and $R_2$ are, independently of one another, a $C_1$-$C_8$-alkyl, $C_1$-$C_4$-alkoxyethyl, $C_1$-$C_4$-alkyl-substituted $C_6$-$C_{10}$-aryl radical, alkyl substituted aryl, aryl substituted alkyl, nitro alkyl, hydroxyl alkyl, alkoxy alkyl, hydroxyl alkoxyalkyl, or $R_1$ and $R_2$ together form R in a six-membered ring, wherein the six membered ring has the general formula (3), (4), or combination thereof:

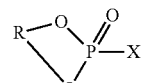

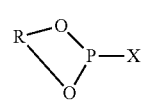

wherein R is a linear or branched divalent alkylene group containing from 3 to about 9 carbon atoms, such as propylene, 2-methylpropylene, neopentylene or 2-butyl-2-ethylpropylene. In one embodiment, the phosphorus containing compound is 2-Chloro-5,5-dimethyl-1,3,2-dioxaphosphinane (where R is neopentylene and X is Cl⁻).

The at least one polyol may be a polyol such as described above and may be the same or different from the at least one polyol (a). In certain embodiments the at least one polyol includes at least one of polyoxalkylene polyol having an equivalent weight about 50-2500. Such polyols may have a combined nominal functionality of about 2-10. The polyoxalkylene may include polyoxyethylene, polyoxypropylene, or a combination of both. In some embodiments, the polyols may be initiated with glycerol, sucrose, sorbitol, novolac or a combination of at least two of them. In some embodiments, the polyols may be polyoxyethylene capped and have a polyoxyethylene percentage of about 5-70%. Examples include SPECFLEX NC630, SPECFLEX NC 632, VORALUX HF 505, VORANOL 280, VORANOL CP260, VORANOL CP450, VORANOL CP 6001, VORANOL IP585, VORANOL RA800, VORANOL RA640, VORANOL RH360, VORANOL RN411, VORANOL RN482, and VORANOL RN490, all available from The Dow Chemical Company. Embodiments include using a mixture of different embodiments of these polyols.

Embodiments encompass sorbitol initiated polyoxypropylene polyols with an equivalent weight of between about 100 and about 200, such as VORANOL RN482 available from The Dow Chemical Company Embodiments encompass glycerol and sucrose initiated polyoxypropylene polyols with an equivalent weight of between about 100 and about 300, such as VORANOL 280 available from The Dow Chemical Company.

The reaction of the at least one polyol and at the least one phosphorus containing compound may be performed in the presence of an amine catalyst. The amine catalyst may be of the general formula $N(R^1)(R^2)(R^3)$, wherein each $R^1$, $R^2$, and $R^3$ is each independently the same or different linear, alkyl group containing from one to about 8 carbon atoms, branched alkyl group containing from 3 to about 8 carbon atoms, linear or branched alkenyl group containing up to about 8 carbon atoms, cyclic alkyl group containing from 5 to about 8 carbon atoms, or an aryl group containing from 6 to about 10 carbon atoms. In one non-limiting embodiment herein, each $R^1$, $R^2$, and $R^3$ group of the above general formula of the amine catalyst is independently the same or different and is selected from the group consisting of methyl, ethyl, propyl, butyl, isopropyl, isobutyl, sec-butyl, tert-butyl, isopentyl, neopentyl, isohexyl, isoheptyl, cyclohexyl and phenyl.

The reaction of the at least one polyol and at least one phosphorus containing compound may be performed in the presence at least one solvent. For example, either or both of the at least one polyol and at least one phosphorus containing compound may be dissolved in the solvent. The solvent may be any solvent which effectively solvates or suspends (with stirring) the phosphorus containing compound component. Effective solvation or suspension can vary greatly depending on the solvent and the amount of phosphorus containing compound employed in the method herein. Preferably, effective solvation/suspension can comprise sufficient solvent to effect solvation/suspension of from 50 weight percent of the phosphorus containing compound, based on the total weight of phosphorus containing compound, to an amount of solvent that is up to about 100 percent more solvent than is necessary for the complete dissolution/suspension of the total phosphorus containing compound being employed, said latter percent being based upon the total amount of solvent necessary to completely solvate/suspend the total amount of phosphorus containing compound being employed Suitable solvents may include toluene, xylene, cyclohexane, n-heptane, hexane, methyl acetate, ethyl acetate, chloromethane, dichloromethane, trichloromethane, hydroxyalkylphosphonate, xylene, tetrahydrofuran (THF), dimethyl formamide (DMF), petroleum ether, acetonitrile, methyl tert-butyl ether, acetone, methyl ethyl ketone, butyl acetate, and combinations thereof.

In some embodiments the reaction of the at least one polyol and at least one phosphorus containing compound may be performed at reduced temperatures, such as between about −20° C. and about 40° C. In some embodiments the reaction temperature is maintained at between about −10° C. and about 30° C.

Embodiments encompass adding dissolved phosphorus containing compound to the at least one polyol which may optionally also be dissolved in a solvent. The at least amine catalyst may be dissolved with the at least one polyol before the phosphorus containing compound is added. Optionally, the at least one amine catalyst may be added to a dissolved mixture of the at least one polyol and at the least one phosphorus containing compound.

The reaction of the at least one polyol with the at least one phosphorus containing compound may proceed over time range of between about 10 minutes to about 10 hours. In some embodiments, the reaction time is about 2 hours.

The at least one polyol and the at least one phosphorus containing compound may be reacted at molar ratios such that the reaction has a capping index from 0.1 to 1. The capping index is the ratio of OH functional groups per molecule of polyol that is reacted or capped with a phosphorus containing compound, as summarized in the following formula:

CI=Md/n×Mp where CI is the capping index, Md is the molar amounts of the at least one phosphorus containing compound, Mp is the molar amounts of the at least one polyol, and n is the nominal OH functionality of at least one polyol.

A capping index of zero equates to no capped OH, and a capping index of 1 equates to all the OH groups being capped. With capping indexes of less than 1, the phosphorus containing flame retardant (FR) still have reactive OH groups which may react with an isocyanate to form a urethane linkage such that the phosphorus containing compound will be on a side chain of the polyurethane network through chemical linkages. The capping index may be any number from 0.05 to 1. All individual values and subranges between 0.05 and 1 are included herein and disclosed herein; for example, the capping index may be from a lower limit of 0.05, 0.1, 0.15, 0.2, 0.25, 0.3, 0.35, 0.4, 0.45, 0.5, 0.6, 0.67, 0.7, 0.75, 0.8, 0.85, or 0.9 to an upper limit of 0.25, 0.3, 0.35, 0.4, 0.45, 0.5, 0.6, 0.67, 0.7, 0.75, 0.8, 0.85, 0.9, 0.95, or 1.

The phosphorus of the flame retardant compounds made using the phosphorus containing compounds of formulas 2 and 4 may optionally be oxidized using suitable oxidizing agents such as manganate, permanganates, and peroxides, such as hydrogen peroxide.

In certain embodiments the at least one phosphorus based flame retardant (b) includes least one phosphorus containing compound having the general formula (5), (6) or combination thereof:

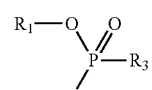

(5)

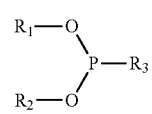

(6)

wherein $R_3$ is at least one of —$CH_2$—OH and —$CH_2$—$CH_2$—OH, —$CH_2$—$CH_2$—$CH_2$—OH, or —$CH_2$—$CH_2$—O—$CH_2$—$CH_2$—OH, $R_1$ and $R_2$ are, independently of one another, a $C_1$-$C_8$-alkyl, $C_1$-$C_4$-alkoxyethyl, $C_1$-$C_4$-alkyl-substituted $C_6$-$C_{10}$-aryl radical, alkyl substituted aryl, aryl substituted alkyl, nitro alkyl, hydroxyl alkyl, alkoxy alkyl, hydroxyl alkoxyalkyl, or $R_1$ and $R_2$ together form R in a six-membered ring, wherein the six membered ring has the general formula (7), (8) or combination thereof:

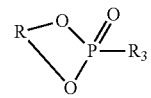

(7)

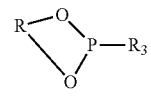

(8)

wherein R is a linear or branched divalent alkylene group containing from 3 to about 9 carbon atoms, such as propylene, 2-methylpropylene, neopentylene or 2-butyl-2-ethylpropylene.

The at least one of a co-reactant (c) may have an equivalent weight of up to 400 and at least one active hydrogen attached to a nitrogen or oxygen atom.

If PHD particles are desired, PHD forming co-reactants may include amines, such as ammonia, anilines and substituted anilines, and fatty amines. The PHD forming co-reactants may also include diamines, such as ethylenediamine, 1,6-hexamethylenediamine, alkonolamines, and hydrazine.

If PIPA particles are desired, PIPA forming co-reactants may include include diols, triols, tetrols, or higher functionality alcohols, such as glycol, glycerol, quadrol, polyglycerine; and alkanolamines, such as monoethanolamine, diethanolamine, triethanolamine, triisopropanolamine, 2-(2-aminoethoxyethanol), hydroxyethylpiperazine, monoisopropanolamine, diisopropanolamine and mixtures thereof. Other alkanolamines which may be considered include N-methylethanolamine, phenylethanolamine, and glycol amine. It is also possible to provide a mixture of PHD and PIPA forming co-reactants to form hybrid PHD-PIPA particles.

The at least one PHD and/or PIPA polymer forming co-reactants are added to the reaction system, in a concentration of between about 2 wt. % and about 40 wt. % of the reaction system, such as between about 5 wt. % and about 25 wt. %. All individual values and subranges between 2 and 30 wt % are included herein and disclosed herein; for example, the concentration may be from a lower limit of 2, 3, 5, 7, 10, 12, 15, 17, 20, 25, 30, or 35 wt % to an upper limit of 5, 7, 10, 12, 15, 17, 20, 25, 30, 35, or 40 wt %.

The reaction system may include at least one catalyst (d). Catalytic quantities of organometallics may be used. Organometallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, chromium, etc. Some examples of these metal catalysts include bismuth nitrate, bismuth neodecanoate, lead 2-ethylhexoate, lead benzoate, lead oleate, dibutyltin dilaurate, tributyltin, butyltin trichloride, dimethyltin stannic chloride, stannous octoate, stannous oleate, dibutyltin di-(2-ethylhexoate), ferric chloride, antimony trichloride, antimony glycolate, tin glycolates, iron acetyl acetonate etc. The catalyst is used to accelerate the reaction of isocyanate with the co-reactant, such as the hydroxyl or secondary or primary amine groups of the alkanolamines or the primary or secondary amines groups of the amine based co-reactant.

Embodiments also include using tertiary amine catalysts such as DABCO 33 LV (a 1,4-diazabicyclo[2.2.2]octane or triethylenediamine) or POLYCAT 77 (a bis-(dimethylaminopropyl)methylamine) as co-catalyst in addition to the metal salt catalyst. Embodiments also include metal salt catalysts based on a fatty acid, such as KOSMOS EF (Stannous ricinoleate); KOSMOS 54 (Zinc ricinoleate), Zinc octoate, or DABCO MB20 (Bismuth neodecanoate). In some embodiments, a combination of tertiary amine catalysts and metal salt catalysts based on a fatty acid is used.

In certain embodiments of the invention, the metal salt catalyst is pre-blended with the co-reactant (the amine and/or amino-alcohol) used to produce the PHD or PIPA particles, and the amine catalyst is pre-blended with the at least one polyol (a). This combination of the two types of catalysts may improve the control of both the reaction of the polyisocyanate with the co-reactant, to get the particles, and the polyisocyanate with the carrier polyol, in order to get particle stabilization. By combining the metal catalyst and the co-reactant, it is found that the polymerization reaction is favored. On the another hand, a too strong reaction of the polyisocyanate with the carrier polyol will increase the final product viscosity, while reducing the PHD or PIPA polymerization process, as more polyisocyanate would be consumed in the reaction with the carrier polyol, hence these two competing reactions have to be balanced to get a stable PHD or PIPA polyol at low viscosity.

The reaction system further includes at least one polyisocyanate (e). Examples of suitable aromatic polyisocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenylmethane-4,4'-diisocyanate and diphenyletherdiisocyanate and 2,4,6-triisocyanatotoluene and 2,4,4'-triisocyanatodiphenylether.

Mixtures of polyisocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, saturated analogues of the above mentioned aromatic isocyanates and mixtures thereof.

The at least one polyisocyanate may be used at an isocyanate index of between about 30 and about 150, such as between about 50 and about 120, between about 60 and about 110, or between 60 and 90. The isocyante index may be kept below 100 to keep PIPA and/or PHD forming co-reactant present in the polymer seeds. The isocyanate index is the ratio of isocyanate-groups over isocyanate-reactive hydrogen atoms present in a formulation. Thus, the isocyanate index expresses the percentage of isocyanate actually used in a formulation with respect to the amount of isocyanate theoretically required for reacting with the amount of isocyanate-reactive hydrogen used in a formulation.

Embodiments of the invention include all the various options of combing the various components of the reaction systems to form PIPA and/or PHD particles. In certain embodiments, the least one phosphorus based flame retardant (b) is preblended and dissolved in the at least one polyol (a). However, in other embodiments the least one phosphorus based flame retardant (b) is dissolved and preblended with the at least one co-reactant (c).

In certain embodiments, under mixing, at least one polyisocyanate (e) is added to the at least one polyol (b), the least one phosphorus based flame retardant (b), the at least one co-reactant (c), and the at least one catalyst (d). Mixing may be produced in stirred reactors or by using static mixers in series, as is know in the art, or more preferably continuously by using a high pressure mixing head, such as those used in polyurethane foaming machines, with multiple streams for polyols, additives, co-reactants, and polyisocyanates.

The at least one PHD and/or PIPA polymer forming co-reactants and polyiisocyanate may be successfully reacted without the application of external heat and atmospheric pressure, although higher temperatures and pressures may also be acceptable. For example, the reaction temperature could range between about 20° C. and about 120° C., and the pressure may range from atmospheric to about 100 psi.

The resulting PIPA and/or PHD, polymer polyol dispersions may have a solids content within the range between about 2 wt. % and about 40 wt. %. All individual values and subranges between about 2 wt. % and about 40 wt. % are included herein and disclosed herein; for example, the solid content may be from a lower limit of 2, 5, 7, 10, 10, 12, 15, 16, 17, 18, 19, 20, 25, 30, or 35 to an upper limit of 7, 10, 12, 15, 16, 17, 18, 20, 25, 30, 35, or 40% of the weight of the polymer polyol dispersions. It is appreciated that these solids levels are calculated based on the addition of concentrations of seeds, co-reactants and polyisocyanates in the total recipe. Because some of the polymer formed may be soluble in the carrier polyol, in what is known as the serum phase, the measurable level of solid particles may be lower than the theoretical amount by up to 30%, preferably by less than 20%, or preferably by less than 10%.

In certain embodiments of the invention, as the at least one phosphorus based flame retardant (b) is preblended and dissolved in the at least one polyol (a) or is pretended and dissolved in the at least one co-reactant (c) and then blended with the at least one polyol (a), the phosphorus based flame retardant (b) has at least one active hydrogen which may along with the at least one co-reactant (c) react with the at least one polyisocyanate (e). This co-reacting of active hydrogens with polyisocyanate may result in PIPA and/or PHD particles that have the phosphorus based flame retardant (b) incorporated or grafted with the matrix structure of the PIPA and/or PHD particles. Thus, the PIPA and/or PHD particles may themselves provide flame retardant properties in a polyurethane foam The polymer polyol dispersion prepared from the various embodiments of the recited reaction system may then be incorporated into a formulation which results in a polyurethane product. The polymer polyol dispersions embodied herein may be used in conjunction with a polyisocyanate such as those mentioned above or may be combined with additional polyols well known in the art, and reacted with a polyisocyanate to form a resulting polyurethane foam product.

In general, the polyurethane foams are prepared by mixing an isocyanate, such as the isocyanates listed above, or combinations thereof, and the polymer polyol in the presence of a blowing agent, catalyst(s) and other optional ingredients as desired. Additional polyols and/or polymer polyols may also be added to the polymer polyol to form a polyol blend before the polymer polyol composition is reacted with the polyisocyanate. The conditions for the reaction are such that the polyisocyanate and polyol composition react to form a polyurethane and/or polyurea polymer while the blowing agent generates a gas that expands the reacting mixture.

The polyol blend may have a total solids content of between about 5 wt. % and about 50 wt. % or more, based on the total mass of the blend. All individual values and subranges between about 5 wt. % and about 50 wt. % are included herein and disclosed herein; for example, the solid content may be from a lower limit of 5, 8, 10, 15, 20, 25, or 30 wt. % to an upper limit of 20, 25, 30, 35, or 40 wt. % of the weight of the blend. In one embodiment the content is between about 8 and 40 wt. %. Additionally fillers, such as mineral fillers, flame retarding agents such as melamine, or recycled foam powder can be incorporated in the polyol blend at levels between 1 and 50% of the polyol blend, or between 2 and 10% of the polyol blend.

The blend may also include one or more catalysts for the reaction of the polyol (and water, if present) with the polyisocyanate. Any suitable urethane catalyst may be used, including tertiary amine compounds, amines with isocyanate reactive groups and organometallic compounds. Exemplary tertiary amine compounds include triethylenediamine, N-methylmorpholine, N,N-dimethylcyclohexylamine, pentamethyldiethylenetriamine, tetramethylethylenediamine, bis(dimethylaminoethyl)ether, 1-methyl-4-dimethylamino-ethyl-piperazine, 3-methoxy-N-dimethylpropylamine, N-ethylmorpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Exemplary organometallic catalysts include organomercury, organolead, organoferric, organobismuth and organotin catalysts, with no organometallic catalysts being preferred. A catalyst for the trimerization of isocyanates, resulting in a isocyanurate, such as an alkali metal alkoxide may also optionally be employed herein. The amount of amine catalysts can vary from 0.02 to 5 percent in the formulation or organometallic catalysts from 0.001 to 1 percent in the formulation can be used. Another option is the use of autocatalytic polyols, based on tertiary amine initiators, replacing the amine catalysts, hence reducing volatile organic compounds in the foam.

Additionally, it may be desirable to employ certain other ingredients in preparing polyurethane polymers. Among these additional ingredients are emulsifiers, silicone surfactants, preservatives, flame retardants, colorants, antioxidants, reinforcing agents, UV stabilizers, etc.

The foam may be formed by the so-called prepolymer method, in which a stoichiometric excess of the polyisocyanate is first reacted with the high equivalent weight polyol(s) to form a prepolymer, which is in a second step reacted with a chain extender and/or water to form the desired foam. Frothing methods may also be suitable. So-called one-shot methods, may also be used. In such one-shot methods, the polyisocyanate and all isocyanate-reactive components are simultaneously brought together and caused to react. Three widely used one-shot methods which are suitable for use herein include slabstock foam processes, high resiliency slabstock foam processes, and molded foam methods.

Slabstock foam may be prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams are typically from about from about 10 kg/m$^3$ to 80 kg/m$^3$, especially from about 15 kg/m$^3$ to 60 kg/m$^3$, preferably from about 17 kg/m$^3$ to 50 kg/m$^3$ in density.

Slabstock foam formulation may contain from about 0.5 to about 6, preferably about 1 to about 5 parts by weight water per 100 parts by weight of polyol at atmospheric pressure. At reduced pressure or at high altitudes, these levels are reduced. High resilience slabstock (HR slabstock) foam may be made in methods similar to those used to make conventional slabstock foam but using higher equivalent weight polyols. HR slabstock foams are characterized in exhibiting a Ball rebound score of 45% or higher, per ASTM 3574.03. Water levels tend to be from about 1 to about 6, especially from about 2 to about 4 parts per 100 parts by weight of polyols.

Molded foam can be made according to the invention by transferring the reactants (polyol composition including copolyester, polyisocyanate, blowing agent, and surfactant) to a closed mold, made of steel, aluminum or epoxy resin, where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resilience molded foam. Densities for molded foams generally range from 30 to 70 kg/m$^3$.

EXAMPLES

The following examples are provided to illustrate the embodiments of the invention, but are not intended to limit the scope thereof. All parts and percentages are by weight unless otherwise indicated.

The following materials are used:

| | |
|---|---|
| ANTIBLAZE TMCP | A phosphorus flame retardant from Albemarle. |
| DABCO 33-LV: | A 33% solution of triethylenediamine in propylene glycol available from Air Products & Chemicals Inc. |
| Diethanolamine 85% | 85% diethanolamine, 15% water, available from The Dow Chemical Company |
| EXOLIT OP 560 | A phosphorous polyol of the type $$HO-R'-O-\left[\begin{array}{c}O\\\|\\P-O-R'-O\\\|\\R\end{array}\right]_n \begin{array}{c}O\\\|\\P-O-R'-OH,\\\|\\R\end{array}$$ and having a hydroxyl number of 400-500 mg KOH/g. Available from Clariant. |
| FR A | A phosphorous based FR additive made by charging 1,3,2-Dioxaphosphorinane, 5,5-dimethyl-, 2-oxide (15 g, 0.1 mol), ethylene dichloride (150 ml), triethylamine (2.02 g 0.01 mol), and paraformaldehyde (3 g 0.1 mol) into a 250 mL 4-necked round bottomed flask outfitted with a mechanical stirrer and a short-path distillation head with attached nitrogen inlet. The solution is heated to 90° C. with stirring for 4 hours. The solution is then cooled to room temperature. Then, the solution is filtered via vacuum filtration. The collected solid is recrystalized by ethanol to get the final product with about 95% purity. |
| FR Polyvol A | A phosphorous based FR polyvol made by the following method: VORANOL RN482 (A sorbitol initiated polyoxypropylene polyvol with an equivalent weight of 117, an OH value of 480 mg KOH/g, and a nominal functionality of 6. Available from The Dow Chemical Company, 210 g, 0.3 mol), triethylamine (Sigma Aldrich, 151.5 g, 1.5 mol) and dichloromethane (Sigma Aldrich, 600 mL) are charged into a three necked flask equipped with a mechanical stirrer. 2-Chloro-5,5-dimethyl-1,3,2-dioxaphosphorinane (Sigma Aldrich, 202.3 g, 1.2 mol) in dichloromethane (200 mL) is added dropwise into the flask maintained at a temperature range of −10° C. to 10° C. The reaction is kept at this temperature range for 2 hours, after which triethylamine-HCl salt byproduct is removed by filtration. Solvent of the filtrate is removed by rotary evaporator. The residue is washed with water first, then the water is removed. The obtained product is dissolved in dichloromethane (600 mL) followed by water washing. The water layer is removed and solvent layer is further dried with anhydrous $MgSO_4$ overnight. The $MgSO_4$ is filtered and the dichloromethane solvent is removed to obtain FR Polyol A having on average two OH groups and four phosphite-containing groups per molecule as confirmed by proton and phosphorus NMR. |
| JEFFAMINE M-600 | A 600 molecular weight polypropylene glycol monoamine, with methoxyethyl termination at the other end. The propylene oxide/ethylene oxide (PO/EO) mol ratio is 9/1. Available from Huntsman Corporation. |
| KOSMOS 29 | A stannous octoate catalyst available from Evonik Industries. |
| KOSMOS 54 | A zinc ricinoleate catalyst available from Evonik Industries. |
| METATIN 1230 | A dimethyltin catalyst available from Acima Specialty Chemicals. |
| NIAX A-1 | A 70% bis(2dimethyl aminoethyl)ether and 30% dipropylene glycol catalyst available from Momentive Performance Materials. |
| ORTEGOL 204 | A block stabilizer available from Evonik Industries. |
| PIPA CPP | VORANOL CP 4735 having 10% solid content, made by first blending METATIN 1380 (0.10 parts by weight) in triethanolamine (23.45 pbw), then blending the METATIN/triethanolamine mixture with VORANOL CP 4735 (450 pbw), then stirring at 1,500 RPM for one minute, followed by the addition of VORANATE T-80 (26 pbw) and final stirring for 2 minutes. |
| TEGOSTAB B8783LF | A low fogging, silicone-based surfactant available from Evonik Industries. |
| Triethanolamine | 99% pure triethanolamine available from ALDRICH. |
| VORANATE* T-80 | A toluene diisocyanate (80% 2,4-toluene diisocyanate and 20% 2,6-toluene diisocyanate by weight) composition available from The Dow Chemical Company. |
| VORANOL* CP 4735 | A glycerine intiated polyoxypropylene polyol having a polyoxyethylene cap, a hydroxyl number in the range of 33 to 38, average molecular weight of 4,700; and a viscosity at 25° C. of 820 cps, available from The Dow Chemical Company. |

*VORANATE and VORANOL are trademarks of The Dow Chemical Company.

a. Pipa Polyols

Examples 1a-8a

PIPA polyols are formulated to give 10% solid content and are made according the following procedure: Catalysts (JEFFAMINE M-600 and METATIN 1230) are pre-blended in triethanolamine or VORANOL CP 4735. The flame retardants (EXOLIT OP 560, FR A, and FR Polyol A) are also pre-blended in triethanolamine or VORANOL CP 4735. The blends are then mixed with Triethanolamine and VORANOL CP 4735 and stirred at 1,500 RPM for one minute, followed by the addition of VORANATE T-80 and final stirring for 2 minutes. The amounts of each component are given in Table 1. The viscosities are measured using a cone and plate viscometer at 20° C.

TABLE 1

| | Example 1a | Example 2a | Example 3a | Example 4a | Example 5a | Example 6a | Example 7a | Example 8a |
|---|---|---|---|---|---|---|---|---|
| VORANOL CP 4735 PIPA CPP | 88.5 | 88.9 | 88.4 | 88.3 | 83.7 | 87.2 | 86.6 | 86.4 |

TABLE 1-continued

|  | Example 1a | Example 2a | Example 3a | Example 4a | Example 5a | Example 6a | Example 7a | Example 8a |
|---|---|---|---|---|---|---|---|---|
| Triethanolamine | 4.69 | 4.69 | 4.69 | 4.69 | 4.69 | 469 | 469 | 4.69 |
| FR A in Triethanolamine | 1 |  |  | 1 | 1 | 1 |  |  |
| FR Polyol A in VORANOL CP 4735 |  | 1 |  |  |  |  | 3 | 3 |
| Exolit OP 560 in Triethanolamine |  |  | 1 |  | 3 |  |  |  |
| Jeffamine M-600 blended in VORANOL CP 4735 |  |  |  |  |  | 1 |  |  |
| Metatin 1230 blended in Triethanolamine | 0.02 | 0.02 | 0.02 |  |  | 0.02 | 0.02 | 0.02 |
| Metatin 1230 in VORANOL CP 4735 |  |  |  | 0.02 |  |  |  | 0.2 |
| Voranate T-80 | 5.79 | 5.46 | 5.92 | 5.79 | 7.6 | 6.07 | 5.74 | 5.74 |
| Viscosity at 20° C. (mPa · s) | 3,873 | 3,682 | 4,667 | 6,348 | 22,414 | 4,260 | 6,250 | 15,180 | b. Foam Formulations

Examples 1b-4b and 6b-8b

The PIPA formulations of Examples 1b-4b and 6b-8b are used in a formulation to produce box foams on the bench, using standard hand-mix procedures (PIPA formulation Example 5a results in highly viscous material). PIPA polyol (85 parts), VORANOL CP 4735 (15 parts), water (2.1 parts), ANTIBLAZE TMCP (12.0 Parts), NIAX A-1 (0.03 parts), DABCO 33LV (0.15 parts), Diethanolamine (1.2 parts), ORTEGOL 204 (1.0 parts), TEGOSTAB B8783LF2 (0.4 parts), KOSMOS 29 (0.14 parts), and KOSMOS 54 (0.5 parts) are blended for 30 seconds at 2,500 rpm. Then VORANATE T-80 is added at an isocyanate index of 115 and mixed at 2,500 RPM for 5 seconds. The reactants are poured in a 20 cm×20 cm×20 cm cardboard mould and cured in an oven at 120° C. for 5 minutes. PIPA polyols listed in Table 2 refer to the PIPA polyols of Table 1.

TABLE 2

|  | Units | Test method | Example 1b | Example 2b | Example 3b | Example 4b | Example 6b | Example 7b | Example 8b |
|---|---|---|---|---|---|---|---|---|---|
| Polyol |  |  | Example 1a | Example 2a | Example 3a | Example 4a | Example 6a | Example 7a | Example 8a |
| Density | kg/m³ | ISO 845-88 | 35.2 | 37.09 | 33.42 | 32.76 | 34.82 | 35.43 | 34.47 |
| CFD 25% | kPa | ISO 3386 | 1.92 | 2.56 | 2.87 | 1.67 | 1.97 | 2.04 | 2.84 |
| CFD 40% | kPa | ISO 3386 | 2.5 | 3.19 | 3.42 | 2.17 | 2.55 | 2.67 | 3.55 |
| CFD 50% | kPa | ISO 3386 | 3.2 | 3.92 | 4.09 | 2.79 | 3.26 | 3.42 | 4.39 |
| CFD 65% | kPa | ISO 3386 | 5.78 | 6.54 | 6.41 | 5.02 | 5.9 | 6.15 | 7.27 |
| SAG | kPa | ISO 3386 | 3.01 | 2.56 | 2.24 | 3.01 | 3 | 3.03 | 2.56 |
| Hysteresis | % | ISO 3386 | 77.78 | 76.27 | 72.87 | 74.2 | 75.8 | 76.25 | 70.47 |
| Tear | N/m | ISO 8067-89 | 304.72 | 239.46 | 228.79 | 251.45 | 288.4 | 272.32 | 208.66 |
| Resilience | % | ASTM D3574 | 61 | 58.5 | 53.5 | 57.5 | 59.5 | 61.25 | 51 |
| Airflow crushed | scfm | ASTM D3574 | 3.25 | 4.04 | 2.18 | 3.78 | 4.23 | 2.92 | 4.27 |
| CS 75% | % | ISO 1856-00 | 7.48 | 7.78 | 7.48 | 14.38 | 11.92 | 9.1 | 9.81 |
| CS 90% | % | ISO 1856-00 | 9.19 | 11.51 | 8.84 | 16.24 | 14.78 | 8.11 | 10.01 |
| Wet CS | % | BS ISO 13362 | 10.26 | 5.91 | 7.84 | 12.39 | 10.11 | 10.85 | 11.48 |
| Crib 5, Weight Loss | g |  | 20 | 25 | 17 | 33 | 25 | 17 | 22 |
| Time to Extinguish | s |  | 160 | 170 | 170 | 200 | 190 | 170 | 190 |

While the foregoing is directed to embodiments of the present invention, other and further embodiments of the invention may be devised without departing from the basic scope thereof, and the scope thereof is determined by the claims that follow.

The invention claimed is:

1. A polymer polyol dispersion comprising a reaction product of a first reaction system, the first reaction system comprising:
   a) at least one polyol;
   b) at least one phosphorus based flame retardant having at least one active hydrogen attached to a nitrogen or oxygen atom:
   c) at least one co-reactant having an equivalent weight of up to 400 and at least one active hydrogen attached to a nitrogen or oxygen atom;
   d) at least one catalyst; and
   e) at least one polyisocyanate,
   wherein the at least one phosphorus based flame retardant is a flame retardant product of a second reaction system for forming the at least one phosphorus based flame retardant, the second reaction system comprising:
   at least one second polyol; and
   at least one phosphorus containing compound having the general formula (1), (2) or combination thereof:

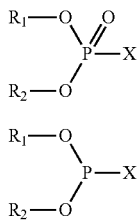

(1)

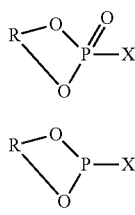

(2)

wherein X is a leaving group, $R_1$ and $R_2$ are, independently of one another, a $C_1$-$C_8$-alkyl, $C_1$-$C_4$-alkoxyethyl, $C_1$-$C_4$-alkyl-substituted $C_6$-$C_{10}$-aryl radical, alkyl substituted aryl, aryl substituted alkyl, nitro alkyl, hydroxyl alkyl, alkoxy alkyl, hydroxyl alkoxyalkyl, or $R_1$ and $R_2$ together form R in a six-membered ring, wherein the six membered ring has the general formula (3), (4), or combination thereof:

(3)

(4)

wherein R is a linear or branched divalent alkylene group containing from 3 to about 9 carbon atoms.

2. The polymer polyol dispersion of claim 1, wherein polymer polyol dispersion comprises a particle population dispersed in the at least one polyol.

3. The polymer polyol dispersion of claim 2, wherein the particle population comprises particles grafted with the at least one phosphorus based flame retardant.

4. The polymer polyol dispersion of claim 1, wherein R is at least one of propylene, 2-methylpropylene, neopentylene, and 2-butyl-2-ethylpropylene.

5. The polymer polyol dispersion of claim 1, wherein the first reaction system includes:
from 0.5 wt. % to 2 wt. %, based on a total weight of the first reaction system, of the at least one phosphorus based flame retardant, and
from 3 wt. % to 15 wt. %, based on the total weight of the first reaction system, of the at least one co-reactant having the equivalent weight of up to 400 and the co-reactant is an amine co-reactant.

6. A method of producing the polymer polyol dispersion of claim 1, the method comprising:
providing the second reaction system;
reacting the second reaction system to form the at least one phosphorus based flame retardant;
providing the first reaction system including:
a) the at least one polyol;
b) the at least one phosphorus based flame retardant;
c) the at least one co-reactant having an equivalent weight of up to 400 and at least one active hydrogen attached to a nitrogen or oxygen atom;
d) the at least one catalyst; and
e) the at least one polyisocyanate; and
reacting the first reaction system to form the polymer polyol dispersion of claim 1.

7. A polymer polyol dispersion comprising a reaction product of a first reaction system, the first reaction system comprising:
a) at least one polyol:
b) at least one phosphorus based flame retardant having at least one active hydrogen attached to a nitrogen or oxygen atom:
c) at least one co-reactant having an equivalent weight of up to 400 and at least one active hydrogen attached to a nitrogen or oxygen atom;
d) at least one catalyst; and
e) at least one polyisocyanate,
wherein the at least one phosphorus based flame retardant comprises at least one phosphorus containing compound having the general formula (5), (6) or combination thereof:

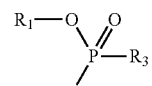

(5)

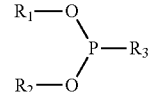

(6)

wherein:
for formula (5) $R_3$ is at least one of —$CH_2$—OH, —$CH_2$—$CH_2$—OH, —$CH_2$—$CH_2$—$CH_2$—OH, —$CH_2$—O—$CH_2$—$CH_2$—OH, —$CH_2$—O—$CH_2$—$CH_2$—$CH_2$—OH, —$CH_2$—O—$CH_2$—$C(CH_3)_2$—$CH_2$—OH, or —$CH_2$—$CH_2$—O—$CH_2$—$CH_2$—OH, $R_1$ and $R_2$ are, independently of one another, a $C_1$-$C_8$-alkyl, $C_1$-$C_4$-alkoxyethyl, $C_1$-$C_4$-alkyl-substituted $C_6$-$C_{10}$-aryl radical, alkyl substituted aryl, aryl substituted alkyl, nitro alkyl, hydroxyl alkyl, alkoxy alkyl, hydroxyl alkoxyalkyl,
or for formula (6), $R_3$ is at least one of —$CH_2$—$CH_2$—OH, —$CH_2$—$CH_2$—$CH_2$—OH, —$CH_2$—O—$CH_2$—$CH_2$—OH, —$CH_2$—O—$CH_2$—$CH_2$—$CH_2$—OH, —$CH_2$—O—$CH_2$—$C(CH_3)_2$—$CH_2$—OH, or —$CH_2$—$CH_2$—O—$CH_2$—$CH_2$—OH, $R_1$ and $R_2$ are, independently of one another, a $C_1$-$C_8$-alkyl, $C_1$-$C_4$-alkoxyethyl, $C_1$-$C_4$-alkyl-substituted $C_6$-$C_{10}$-aryl radical, alkyl substituted aryl, aryl substituted alkyl, nitro alkyl, hydroxyl alkyl, alkoxy alkyl, hydroxyl alkoxyalkyl,
or $R_1$ and $R_2$ together form R in a six-membered ring, wherein the six membered ring has the general formula (7), (8) or combination thereof:

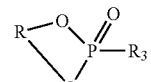

(7)

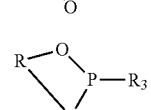

(8)

wherein R is a linear or branched divalent alkylene group containing from 3 to about 9 carbon atoms.

8. The polymer polyol dispersion of claim 7, wherein polymer polyol dispersion comprises a particle population dispersed in the at least one polyol.

9. The polymer polyol dispersion of claim 8, wherein the particle population comprises particles grafted with the at least one phosphorus based flame retardant.

10. The polymer polyol dispersion of claim 7, wherein the first reaction system includes:
   from 0.5 wt. % to 2 wt. %, based on a total weight of the first reaction system, of the at least one phosphorus based flame retardant, and
   from 3 wt. % to 15 wt. %, based on the total weight of the first reaction system, of the at least one co-reactant having the equivalent weight of up to 400 and the co-reactant is an amine co-reactant.

11. A method of producing the polymer polyol dispersion of claim 7, the method comprising:
   providing the first reaction system including:
   a) the at least one polyol;
   b) the at least one phosphorus based flame retardant;
   c) the at least one co-reactant having an equivalent weight of up to 400 and at least one active hydrogen attached to a nitrogen or oxygen atom;
   d) the at least one catalyst; and
   e) the at least one polyisocyanate; and
   reacting the first reaction system to form the polymer polyol dispersion of claim 7.

\* \* \* \* \*